United States Patent Office 3,451,497
Patented June 24, 1969

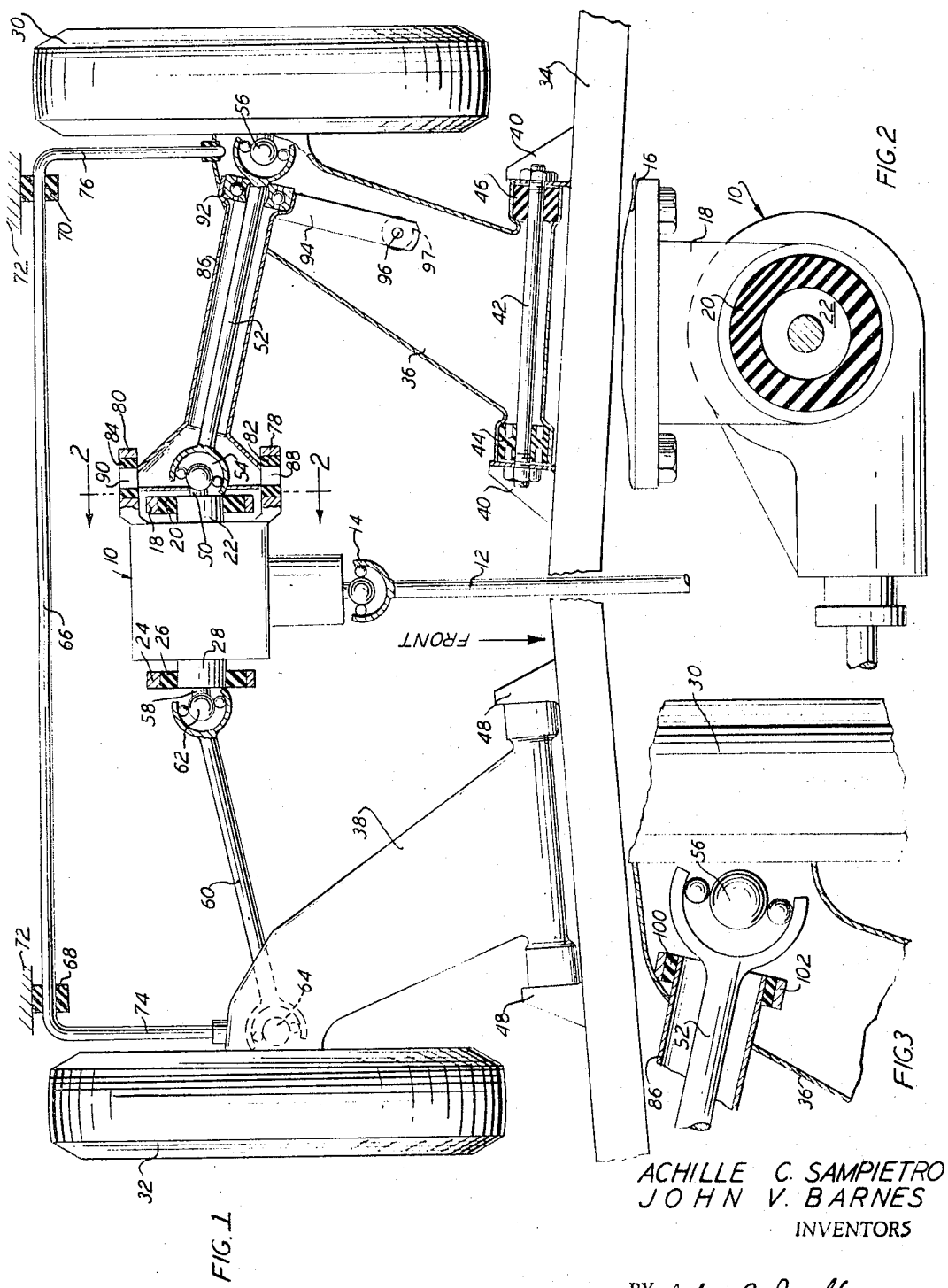

3,451,497
INDEPENDENT REAR SUSPENSION FOR A MOTOR VEHICLE WITH ANTISQUAT CHARCTERISTICS
John V. Barnes, Detroit, and Achille C. Sampietro, Bloomfield Hills, Mich., assignors to Ford Motor Company, Dearborn, Mich., a corporation of Delaware
Filed Mar. 1, 1967, Ser. No. 619,738
Int. Cl. B60g 9/02; B60k 17/16
U.S. Cl. 180—73         15 Claims

ABSTRACT OF THE DISCLOSURE

An independent rear suspension system for a motor vehicle having a resiliently mounted differential housing and a laterally extending torque reaction member that is connected to one of two suspension arms. The suspension components are arranged to provide an antisquat force during acceleration.

Background of the invention

In vehicles with a powerful engine, a soft suspension, and a fairly high center of gravity, there is a tendency during acceleration for the rear end to drop or to "squat" due to weight transfer. According to the present invention, the reaction from driving torque is used to counteract this effect of the weight transfer.

The weight transfer increases the normal forces between the tires and the road and this has the beneficial effect of increasing the maximum permissible acceleration. The present invention does not reduce the weight transfer but rather counteracts one of its effects by tending to keep the vehicle body leveled during acceleration.

Brief summary of the invention

In accordance with this invention, a rear suspension system for a motor vehicle is provided in which the differential housing is resiliently supported from the vehicle chassis. The left and right driving wheels are positioned by trailing suspension arms. A torque reaction member extends laterally from one side of the differential housing and has an arm connected to the adjacent suspension arm so that torque reaction is transferred from the differential through the torque reaction member to the suspension arm. During acceleration, forces are transmitted to the suspension arm which tend to prevent the rear end of the vehicle from squatting.

Brief description of the drawing

FIGURE 1 is a top plan view of an independent rear suspension for a motor vehicle incorporating the present invention;

FIGURE 2 is a side elevational view taken along section lines 2—2 of FIGURE 1; and FIGURE 3 is an enlarged view showing an alternate connection between the torque reaction member and the left suspension arm.

Detailed description of the inveniton

Referring now to the drawings wherein the presently preferred embodiment of this invention is illustrated, FIGURE 1 discloses an independent rear suspension for a motor vehicle. In FIGURE 1, a differential gear housing 10 receives torque from a drive shaft 12 to which it is connected by means of a universal joint 14. The differential 10 is secured to a chassis frame member 16 by means of brackets 18 and 24 bolted thereto.

The bracket 18 surrounds a large annular rubber member 20 which, in turn, surrounds lateral cylindrical extension 22 of the differential 10. FIGURE 2 discloses the bracket 18 and rubber member 20 supporting the left side of the differential. Similarly, the bracket 24 has an annular rubber member 26 that surrounds a cylindrical member 28 extending from the right-hand side of the differential. This structure supports the differential against vertical and horizontal movement, however, it provides only limited restriction to rotation about the axis of the cylindrical members 22 and 28. The means for restraining angular displacement of the differential 10 will be described later.

Left and right road wheels 30 and 32 are positioned with respect to the chassis frame member 34 by means of pivotally mounted trailing suspension arms 36 and 38. The forward end of trailing arm 36 is connected to frame bracket 40 by means to a pivot shaft 42 which engages rubber bushings 44 and 46 that are seated in appropriate portions formed in the forward end of the arm 36. The rear end of the arm 36 is angled outwardly and is rigidly secured to the wheel bearing housing for the wheel 30. The arm 36 is thus adapted to support the wheel for jounce and rebound movement.

In a similar fashion, suspension arm 38 is pivotally mounted to frame brackets 48 at its forward end. The rear end of the arm 38 is rigidly connected to the wheel bearing housing for the wheel 32.

An output shaft 50 extending from the left side of the differential 10 is connected to an axle shaft 52 by means of a constant velocity universal joint 54. A second constant velocity joint 56 is situated at the outer end of the shaft 52 and joins it to the wheel 30. The suspension arm 36 is substantially hollow being formed of sheet metal and the outer end of the axle shaft 52 extends into the interior of the rear portion of the arm 36. The outer universal joint 56 is situated within that portion of the arm.

In a similar fashion, the right-hand output shaft 58 of the differential 10 is joined to the driving shaft 60 by means of a constant velocity universal joint 62. The outer end of the shaft 60 is joined to the wheel 32 in a driving fashion by means of an outer universal joint 64.

An antisway bar 66 is journalled in rubber mounts 68 and 70 that are connected to the chassis frame portions 72. The main portion of the sway bar 66 extends laterally of the vehicle and has forwardly extending arm members 74 and 76. The forward end of arm 74 is connected to the rear of the suspension arm 38. Similarly, the forward end of stabilizer bar arm 76 is connected to the rear end of suspension arm 36.

Means are provided for transferring torque from the differential to the suspension arm 36. In accordance with the present invention, such means comprise a pair of spaced apart flanges 78 and 80 secured to the differential housing 10 in which resilient bushings 82 and 84 are positioned. A hollow torque reaction member 86 surrounds the shaft 52 and has an inner end with projecting portions 88 and 90 that are jouralled within the resilient bushings 82 and 84 of the differential. The torque reaction member 86 extends laterally and has its outer end positioned within the hollow suspension arm 36. A ball bearing 92 positions the reaction member 86 with respect to the axle shaft 52. A forwardly extending arm 94 has one end connected to the torque reaction member 86 and its other end connected at 96 to the suspension arm 36. In order to accommodate relative movement between the member 86 and the arm 36, a resilient puck 97 is used at the connection 96. Arm 94 may also be formed of torsionally resilient material.

The ball bearing 92 has its inner race connected to the shaft 52 by means of a spherical bearing to permit the wheel 30 to move in jounce and rebound without binding. Some relative movement between the various parts is possible due to the several rubber bushings present in the system.

FIGURE 3 discloses an alternate connection between the torque reaction member 86 and the suspension arm 36. In this view, a rubber bushing 100 is secured in the annular member 102 welded to the suspension arm 36. The end of the torque reaction member 86 is secured to the bushing 100. As in the construction of FIGURE 1, torque is transmitted through the member 86 to the suspension arm 36. It is also to be noted that the ball bearing 92 is not used.

*Operation*

During acceleration of a vehicle having the suspension of FIGURE 1, the reaction from the driving torque will be transmitted through the torque member 86 and the arm 94. The torque reaction will be in a direction tending to lift the pivot shaft 42 and to depress the rear end of the suspension arm 36. This will increase the load between the tire 30 and the road. Part of this effect will be transmitted to the opposite tire 32 by means of the sway bars 66. The torque reaction tending to raise the pivot shaft 42 is contrary to the natural squat force produced by the weight transfer resulting from the acceleration. Thus, it is apparent that the suspension produces anti-squat forces tending to keep the vehicle body level during acceleration.

It is to be understood that this invention is not limited to the exact construction shown and described above, but rather that various changes and modifications may be made with out departing from its scope and spirit.

We claim:

1. An independent rear suspension system for a motor vehicle having a support structure, a differential, means connecting said differential to said support structure and constructed for limited pivotal movement of said differential about a transverse axis, left and right road wheels positioned laterally of said differential, left and right suspension arms, said suspension arms having one of their ends pivotally connected to said support structure and their other ends connected to said whee, left and right axle shafts extending laterally from said differential and drivingly connected to said left and right wheels, left and right universal joints connecting said axle shafts to said differential, a torque reaction member connected to said differential and having an outer end connected to one of said suspension arms.

2. An independent suspension system according to claim 1 and including:
   an antisway bar supported on said support structure and having its ends connected to said left and right suspension arms.

3. An independent suspension system according to claim 1 and including:
   said torque reaction member being pivotally connected to said differential by means having a longitudinal pivot axis.

4. An independent suspension system according to claim 1 and including:
   an antisway bar supported on said support structure and having its ends connected to said left and right suspension arms, said torque reaction member being pivotaly connected to said differential by means having a longitudinal pivot axis.

5. An independent suspension system according to claim 1 and including:
   said torque reaction member being connected to said one arm by resilient means constructed for relative displacement.

6. An independent suspension system according to claim 5 and including:
   an antisway bar supported on said support structure and having its ends connected to said left and right suspension arms.

7. An independent suspension system according to claim 1 and including:
   said torque reaction member being pivotally connected to said differential by means having a longitudinal pivot axis, said torque reaction member being of elongated hollow construction and surrounding one of said drive shafts.

8. An independent suspension system according to claim 7 and including:
   said torque reaction member being connected to said one arm by resilient means constructed for relative displacement.

9. An independent suspension system according to claim 8 and including:
   an antisway bar supported on said support structure and having its ends connected to said left and right suspension arms.

10. An independent rear suspension system for a motor vehicle according to claim 1 and including:
    means coupling said torque reaction member to said one arm and constructed to impart a force couple upon said one arm when said differential is angularly displaced about said transverse axis.

11. An independent rear suspension system for a motor vehicle having a support structure, a differential, means connecting said differential to said support structure and constructed for limited pivotal movement of said differential about a transverse axis, left and right road wheels positioned laterally of said differential, left and right suspension arms, said suspension arms having one of their ends pivotally connected to said support structure and their other ends connected to said wheel, left and right axle shafts extending laterally from said differential and drivingly connected to said left and right wheels, a torque reaction member connected to said differential, means coupling said torque reaction member to one of said suspension arms and constructed to impart a force couple upon said one arm when said differential is angularly displaced about said transverse axis whereby reaction forces created upon the acceleration of said vehicle will be transferred from said differential through said member to said one arm in a direction tending to offset the squat forces produced by said acceleration.

12. An independent rear suspension system for a motor vehicle according to claim 11 and including:
    a wheel support member rotatably supporting one of said wheels, said one arm being rigidly connected to said wheel support member.

13. An independent rear suspension system for a motor vehicle according to claim 12 and including:
    left and right universal joints connecting said left and right axle shafts respective to said differential.

14. An independent rear suspension system for a motor vehicle having a support structure, a differential, resilient means connecting said differential to said support structure and constructed to resiliently resist movement of said differential relative to said support structure, said resilient means providing greater resistance to angular displacement of said differential about longitudinal and vertical axes than about a transverse axis, left and right road wheels positioned laterally of said differential, left and right suspension arms, said suspension arms having one of their ends pivotally connected to said support structure and their other ends connected to said wheel, left and right axle shafts extending laterally from said differential and drivingly connected to said left and right wheels, a torque reaction member connected to said differential and having an outer end, means coupling said torque reaction member to said arm and constructed to impart a force couple upon said one arm when said differential is angularly displaced about said axis.

15. An independent rear suspension system for a motor vehicle having a support structure, a differential, resilient means connecting said differential to said support structure and constructed to resiliently resist movement of said differential relative to said support structure, said resilient means providing greater resistance to angular displacement of said differential about longitudinal and vertical axes than about a transverse axis, left and right road wheels positioned laterally of said differential, left and right suspension arms, said suspension arms having one of their ends pivotally connected to said support structure and their outer ends connected to said wheel, left and right axle shafts extending laterally from said differential and drivingly connected to said left and right wheels, a torque reaction member connected to said differential and having an outer end connected to one of said suspension arms, and right universal joints connecting said left and right axle shafts respectively to said differential.

References Cited

UNITED STATES PATENTS 2,818,128   12/1957   Uhlenhaut et al.

FOREIGN PATENTS 1,010,960   11/1965   Great Britain.

A. HARRY LEVY, *Primary Examiner.*